US008611296B2

(12) United States Patent
Chen

(10) Patent No.: US 8,611,296 B2
(45) Date of Patent: *Dec. 17, 2013

(54) METHOD AND APPARATUS FOR DATA TRANSFER IN A PACKET-SWITCHED NETWORK

(75) Inventor: Xiaobao Chen, Swindon (GB)

(73) Assignee: Orange SA, Paris (FR)

( * ) Notice: Subject to any disclaimer, the term of this patent is extended or adjusted under 35 U.S.C. 154(b) by 60 days.

This patent is subject to a terminal disclaimer.

(21) Appl. No.: 13/205,487

(22) Filed: Aug. 8, 2011

(65) Prior Publication Data

US 2011/0286425 A1    Nov. 24, 2011

Related U.S. Application Data

(63) Continuation of application No. 11/089,524, filed on Mar. 23, 2005, now Pat. No. 7,995,523, which is a continuation of application No. PCT/GB03/04152, filed on Sep. 24, 2003.

(30) Foreign Application Priority Data

Sep. 24, 2002  (GB) ................................... 0222187.7
Dec. 31, 2002  (GB) ................................... 0230336.0

(51) Int. Cl.
*H04W 4/00*    (2009.01)

(52) U.S. Cl.
USPC ........ 370/329; 370/341; 370/443; 455/422.1; 455/445; 455/450; 455/452.2

(58) Field of Classification Search
USPC ......... 370/229, 230, 319–322, 328, 329, 330, 370/341, 437, 441–443, 465, 466; 455/422.1, 445, 450–452.2, 464; 726/13, 15
See application file for complete search history.

(56) References Cited

U.S. PATENT DOCUMENTS

| | | | |
|---|---|---|---|
| 7,054,945 B2 | 5/2006 | Hurtta et al. | |
| 7,167,447 B2 * | 1/2007 | Puuskari et al. | ............. 370/328 |
| 7,248,582 B2 | 7/2007 | Belgaied et al. | |
| 7,437,154 B2 | 10/2008 | Hahn | |
| 7,447,765 B2 | 11/2008 | Aerrabotu et al. | |
| 7,496,068 B2 | 2/2009 | Chen | |
| 8,345,606 B2 * | 1/2013 | Chen | ............................ 370/329 |

(Continued)

OTHER PUBLICATIONS

Perkins, C., IP Mobility Support, IETF Request for Comment (RFC) 2002, http://www.ietf.org/rfc/rfc2002/txt?number=2002, Oct. 1996, 74 pgs.

(Continued)

*Primary Examiner* — Jeffrey M Rutkowski
(74) *Attorney, Agent, or Firm* — Knobbe Martens Olson & Bear LLP

(57) ABSTRACT

Apparatus for and methods of enabling a gateway node of a first packet-switched data network to select a first channel for transferring a tunneled data packet to a destination packet data protocol address of a mobile node provided service in the first network are disclosed. The gateway node is configured to select the first channel from a plurality of channels configured to transfer data packets to the destination packet data protocol address of the mobile node, and the selection is performed by matching a packet data protocol address, associated with a data packet received by the gateway node, to one or more data packet filters associated with the plurality of channels.

21 Claims, 9 Drawing Sheets

(56) References Cited

U.S. PATENT DOCUMENTS

| | | |
|---|---|---|
| 2002/0031108 A1 | 3/2002 | Inoue |
| 2002/0057657 A1 | 5/2002 | La Porta et al. |
| 2002/0154642 A1 | 10/2002 | Hagirahim et al. |
| 2003/0039259 A1 | 2/2003 | Madour |
| 2004/0081086 A1 | 4/2004 | Hippelainen et al. |
| 2004/0151155 A1 | 8/2004 | Jouppi |
| 2005/0265363 A1 | 12/2005 | Chen |
| 2006/0153124 A1 | 7/2006 | Kant et al. |
| 2006/0256719 A1* | 11/2006 | Hsu et al. ............... 370/230 |

OTHER PUBLICATIONS

Johnson, et al., Mobility Support in IPv6 <draft-ietf-mobileip-ipv6-18.txt>, IETF Internet Draft, http://www.ietf.org/proceedings/02jul/I-D/draft-ietf-mobileip-ipv6-18.txt, Jun. 2002, 160 pgs.

Conta, A., Generic Packet Tunneling in IPv6—Specification, IETF Request for Comment (RFC) 2473, http://www.ietf.org/rfc/rfc2473.txt?number=2473, Dec. 1998, 34 pgs.

$3^{rd}$ Generation Partnership Project, Technical Specification Group Services and System Aspects, General Packet Radio Service (GPRS), Service Description, Stage 2 (Release 1999), 3GPP TS 23.060 v3.12.0 (Jun. 2002) Technical Specification, http://www.3gpp.org/ftp/specs/2002-06/R1999/23_series/ 192 pgs.

$3^{rd}$ Generation Partnership Project, Technical Specification Group Services and Systems Aspects, Architectural Requirements for Release 1999 (Release 1999), 3GPP TS 23.121 v3.6.0 (Jun. 2002) Technical Specification, http://www.3gpp.org/ftp/specs/2002-06/R1999/23_series/, 57 pgs.

Deering, et al., Internet Protocol, Version 6 (IPv6) Specification, Request for Comment (RFC) 2460, http://www.ietf.org/rfc/rfc2460.txt?number=2460, Dec. 1998, 37 pgs.

Perkins, IP Mobility Support, Oct 1996, Network Working Group, RFC 2002, pp. 10-11, 19.

* cited by examiner

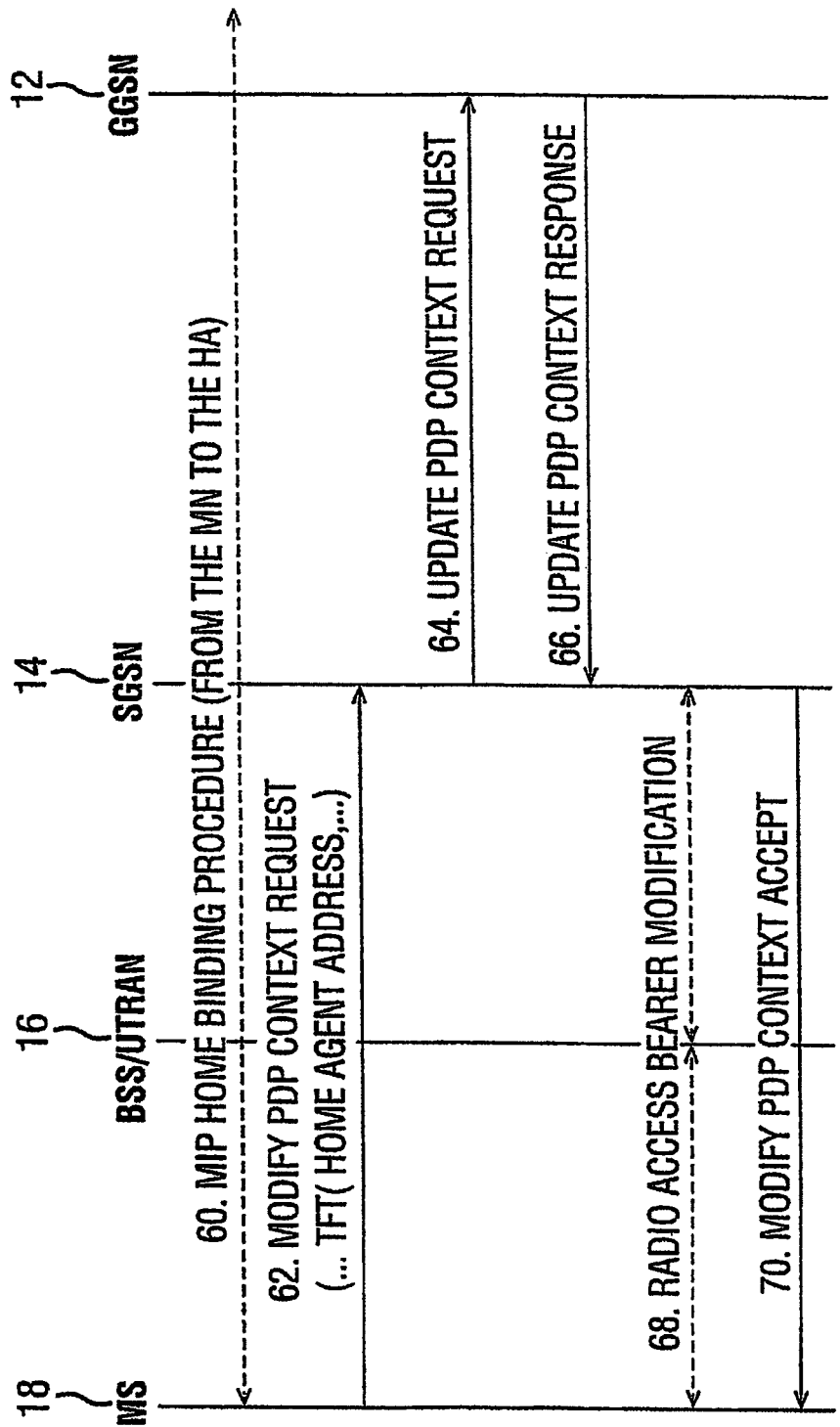

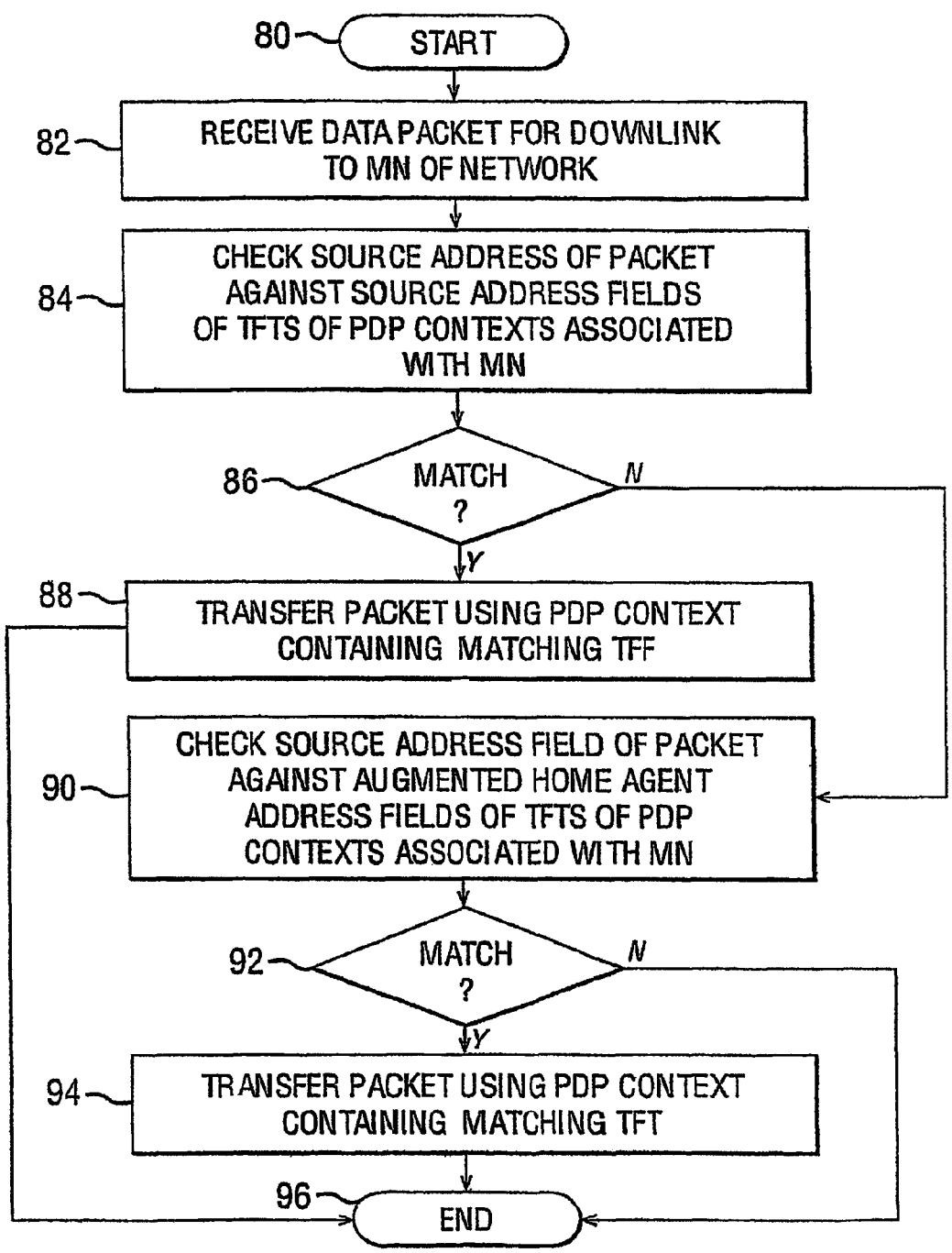

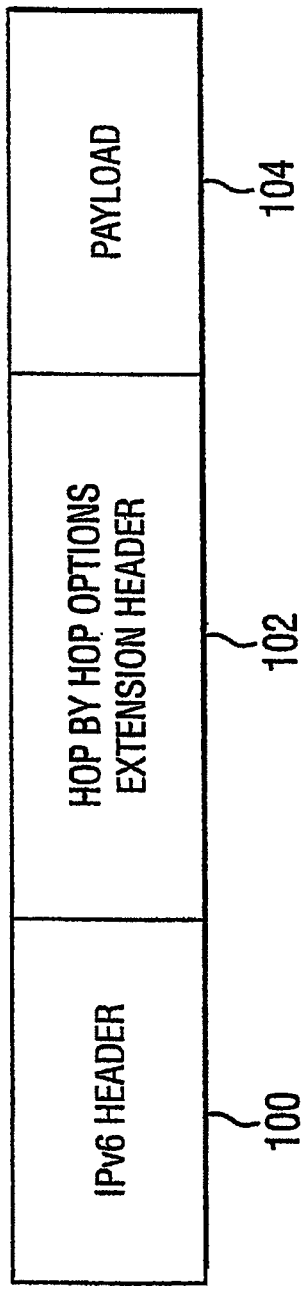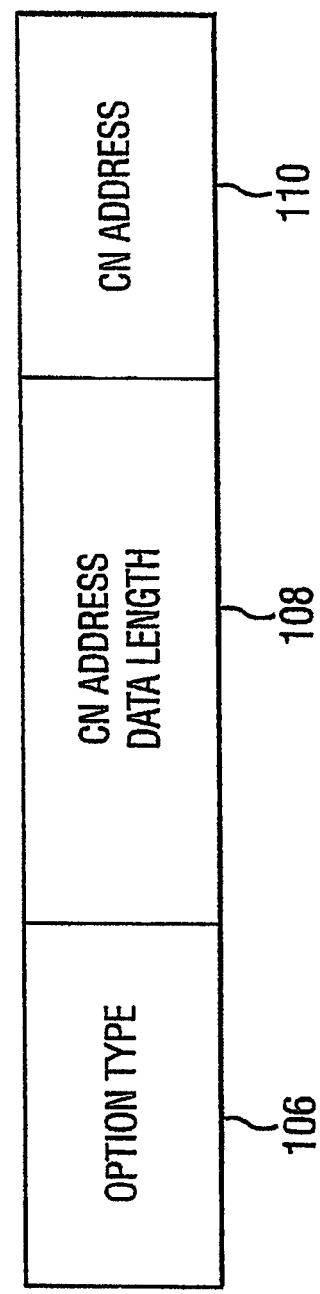

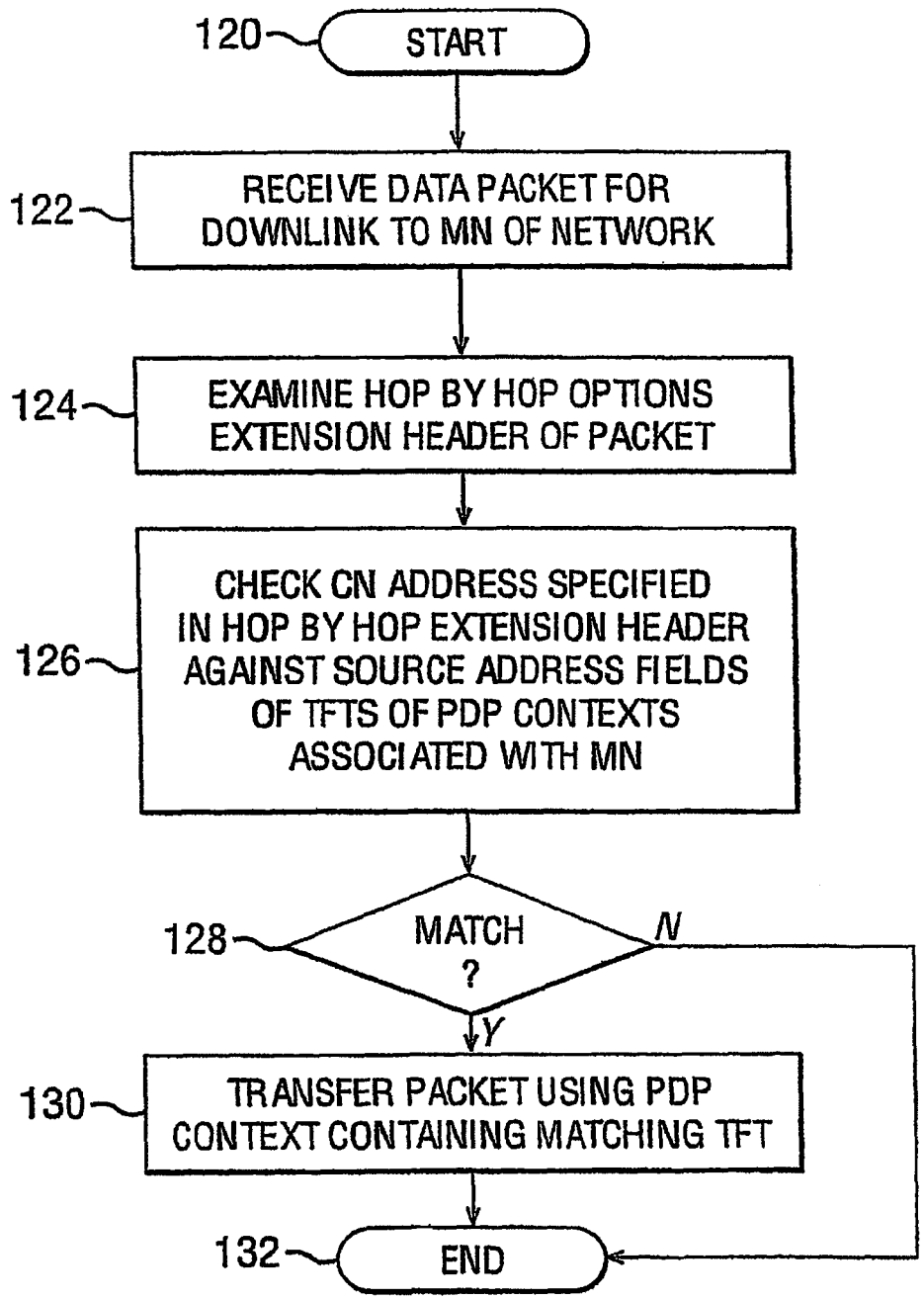

METHOD AND APPARATUS FOR DATA TRANSFER IN A PACKET-SWITCHED NETWORK

CROSS REFERENCE TO RELATED APPLICATION

This application is a continuation of U.S. application Ser. No. 11/089,524, filed Mar. 23, 2005, which claims priority under 35 U.S.C. §120 to PCT International Application Number PCT/GB03/004152, filed on Sep. 24, 2003 and published in the English language, which claims priority under 35 U.S.C. §119 to United Kingdom Patent Application Number 0222187.7 filed on Sep. 24, 2002, and United Kingdom Patent Application Number 0230336.0 filed on Dec. 31, 2002. The disclosures of the above-described filed applications are hereby incorporated by reference in their entirety.

FIELD OF THE INVENTION

The present invention relates to data transfer in a packet-switched network.

BACKGROUND

Whereas conventional 2G mobile networks, such as those conforming to the Global System for Mobile Communications (GSM) standards, have provided circuit-switched voice and data services to user's mobile stations (MSs), there is great momentum in the mobile telecommunications industry to deploy packet-switched mobile networks. Packet-switched mobile networks have significant advantages in terms of network and radio resource efficiency and also enable the provision of more advanced user services. With the convergence of fixed and mobile telecommunications networks, the Internet Protocol (IP), widespread in fixed networks, is the natural choice as the packet routing mechanism for mobile packet networks. Currently IP version 4 (IPv4) is in widespread use in the fixed network domain. However, it is expected gradually to migrate to IP version 6 (IPv6) which offers well-recognised benefits over IPv4, notably in terms of greatly increased address space, more efficient routing, greater scalability, improved security, Quality of Service (QoS) integration, support for multicasting and other features.

Particular examples of mobile packet-switched services currently being deployed include the General Packet Radio Service (GPRS) as implemented in both 2G GSM networks and in 3G Universal Mobile Telecommunications System (UMTS) networks (hereinafter referred to as GPRS networks). It is also expected that non-GPRS wireless access technologies, such as wireless Local Area Network (wLAN), will provide a flexible and cost-effective complement to GPRS for local broadband service access in some areas such as hotspots (conference centres, airports, exhibition centres, etc). Consequently mobile network operators will want to support roaming of mobile stations between GPRS and non-GPRS networks or subnetworks.

While GPRS networks, having been designed from the start as mobile networks, have built-in mobility management (for MSs within the GPRS network) and roaming functionality (for MSs roaming between GPRS networks), work has also taken place in the Internet Engineering Task Force (IETF) to support mobility of IP user terminals in general. To this end, the IETF have developed the Mobile IP (MIP) protocols. MIP is designed to support mobility when mobile stations (or mobile nodes (MNs) in MIP terminology) move between IP networks with different subnet prefixes (macro-mobility). For example, MIP may be used to support mobility between a GPRS network and a non-GPRS network such as a wLAN network. Mobile IP is not expected to be used for mobility management within a network or subnetwork (micro-mobility) which is typically managed by access technology specific layer 2 mechanisms such as WCDMA softer/soft handover.

There are two versions of MIP to correspond to the two versions of IP. MIP version 4 (MIPv4) is designed to provide IP address mobility for IP version 4 (IPv4) addresses, whereas the newer MIP version 6 (MIPv6) MIP is designed to provide IP address mobility for IP version 6 (IPv6) addresses. MIPv4 is described in the IETF Request For Comment (RFC) 2002 available at the IETF website http://www.ietf.org/rfc/rfc2002.txt?number=2002. Internet draft MIPv6 is described in the IETF Internet draft "Mobility Support in IPv6" available at the IETF website at http://search.ietf.org/internet-drafts/draft-ietf-mobileip-ipv6-18.txt and referenced as draft-ietf-mobileip-ipv6-18.txt.

MIPv4 mobility management is illustrated in FIG. 1. A MN 40 is allocated a home IP address (HAddr) in its Home Network (HN) 42. Routing procedures in the HN ensure that wherever the MN is within the HN, an IP packet sent from a Correspondent Node (CN) 46 will reach the MN. However, when the MN roams to a foreign network (FN) 44, IP packets addressed to its HAddr will need to be routed to its new location in the FN. In MIPv4, a router 48 in the HN known as the Home Agent (HA) is used to act as a packet forwarding service on behalf of the MN when it is away from home. In a first working mode of MIPv4 (known as FA-CoA mode), when arriving in the FN, the MN is allocated a Care of Address (CoA) by a router 50 in the FN known as the Foreign Agent (FA). Due to perceived limitations of IPv4 address space, it is envisaged that more than one MN may share the same CoA. After allocation of the CoA, the FA 50 sends a binding update to the HA to register the CoA. Thereafter, when the CN sends a packet to the HAddr of the MN in its HN (case 1), the packet is intercepted by the HA and tunneled to the FA in the FN via tunnel 52 on the basis of the CoA.

Tunneling involves encapsulating a first data packet (with a header and a payload) as the payload of a second data packet having a new header indicating, as its source and destination addresses, the start and end points of the tunnel, and transferring the second data packet as normal to the tunnel endpoint where it is decapsulated to obtain the first packet. After decapsulation, the tunnel end point, the FA, routes the original packet to the MN using routing procedures in the FN. In MIP, tunneling involves IP in IP encapsulation using the IETF Request For Comment (RFC) 2003. Thus in MIPv4, an IPv4 packet is tunneled by encapsulating it within another IPv4 packet.

As an optional procedure in MIPv4, the MN may then send a binding update to the CN to register its CoA. Thereafter, the CN may address packets directly to the MN at its current CoA, rather than indirectly via its HAddr (case 2), and these packets are received by the FA in the FN and routed to the MN using routing procedures in the FN. This is known as route optimisation since it avoids potentially inefficient triangular routing via the HA which in general will not be on an efficient routing path between the CN and the FA.

In a second optional working mode of MIPv4 (known as CoCoA mode) there is no sharing of CoAs by MNs away from their home network and no FA is used. The MN is allocated a unique CoA, known as a co-located CoA (Co-CoA), using standard dynamic IP address allocation procedures—eg using Dynamic Host Control Protocol (DHCP). In this working mode, the MN must itself send a binding update to its HA to register its newly allocated CoCoA. Thereafter, packets sent by a CN and addressed to the MN at its HAddr are tunneled from the HA directly to the MN. As with FA-CoA mode, as an optional procedure in CoCoA mode, the MN may also send a binding update to a CN to register its CoCoA. Thereafter, packets may be sent by the CN directly to the MN at its CoCoA.

MIPv6 mobility management is illustrated in FIG. 2. Two notable differences of MIPv6 over MIPv4 are as follows. Firstly, due to the greatly increased address space in IPv6, CoAs allocated to a MN in a FN are never shared (ie they correspond to the optional CoCoA in MIPv4). Secondly, as a result, there is no need to deploy a FA in the FN. Referring to FIG. 2, with MIPv6, when a MN 40 moves from its HN 42 to a FN 44, it is allocated a unique CoA and sends a binding update to its HA 48 in its HN to register the CoA. Packets from a CN 46 addressed to the HAddr are intercepted by the HA 48 (case 1) and tunneled to the CoA via tunnel 54. This tunneling may be achieved using IPv6 Generic Packet Tunneling Mechanism described in IETF RFC 2473. However, in MIPv6, route optimisation is not an option but a fundamental part of the protocol and, in general, the MN should send a binding update to the CN so that it may address packets directly to the MN at its CoA (case 2). When an MN receives a packet tunneled from a CN via the MN's HA, it may take this as an indication that the CN has no binding for the MN and initiate a CN binding update. Note that in MIPv6 the CN binding update must use the new CoA of the MN as the source address in the IPv6 header (see Clause 11.6.2 of the MIPv6 IETF Internet draft).

The 3rd Generation Partnership Project (3GPP) responsible for the GPRS standards has recognised that MIP may need to be supported in GPRS networks. Technical Specification 23.060 Clause 5.7 states that "To support the optional Mobile IP services, see 3G TS 23.121, efficiently in the packet domain, Foreign Agent (FA) functionality needs to be provided in the GGSN. The interface between the GGSN and FA, including the mapping between the care of IP address and the GTP tunnel in the PLMN is assumed not to be standardized as the GGSN and FA are considered to be one integrated node." Furthermore, 3G TS 23.121 (available from the 3GPP website at http://www.3gpp.org/ftp/specs/2002-06/R1999/23_series!) states that " . . . it is important to offer Mobile IP also to UMTS and GPRS users to allow them to roam to and from other access technologies while keeping ongoing data sessions, e.g. TCP or UDP" and that "as IP addresses in IPv4 are scarce, it has to be assumed that Mobile IPv4 preferably will be used with the Foreign Agent (FA) care-of addresses. Compared to using co-located care-of addresses, FA care-of addresses does not only conserve IP addresses, it is also more efficient over the radio interface."

However, there may be circumstances in which the above assumptions are false. Firstly, a GPRS network operator may want to use CoCoAs in MIPv4 instead of FA CoAs. For instance, IPv4 addresses may not be scarce within a particular GPRS network and CoCoAs may be preferred to improve scalability and routing efficiency. Secondly, there may be circumstances in which the GPRS network operator would not want to integrate FA functionality in the Gateway GPRS Support Node (GGSN) which is the gateway connecting the GPRS network to external packet-switched networks. For instance, the GGSN may be heavily loaded and separating the GGSN and FA functionality would improve load balancing. Furthermore, it may be considered beneficial to locate the FA in nodes which are closer to the edges of the GPRS network, such as access nodes, for improved scalability. Thirdly, the 3GPP has itself recently mandated that IPv6 must be supported in UMTS R5 IP Multimedia System (IMS) and IP radio access networks in general. Thus, it is clear that GPRS networks will need to support MIPv6 as well as MIPv4 in future and, as described above, MIPv6 has no FA and uses CoAs which are unique to the MN (ie always "co-located").

The present inventors have realised that problems arise in GPRS networks implemented according to the present service descriptions (Release 1999) in each of the three circumstances listed above. One particular feature of GPRS networks, which conform to Release 1999 and Post Release 1999 (e.g. R4, R5) of the GPRS Service Description, is support for what are known as packet data protocol (PDP) contexts. Specifying different PDP contexts are useful for a variety of reasons. In particular, PDP contexts allow differing QoS levels and other parameters to be specified for traffic to and from a single PDP address of a MS. This allows efficient transfer of a variety of data traffic, such as non real-time traffic (eg intermittent and bursty data transfers, occasional transfers of large volumes of data) and real-time traffic (eg voice, video). For example, a MS in a GPRS network, having a PDP address, such as an IPv4 or IPv6 address, may communicate with a plurality of other telecommunications devices in external packet-switched networks using different PDP contexts with differing QoS parameters for each one. It is generally the duty of the MS to create and modify PDP contexts as required.

Incoming data packets from an external network for downlink to a MS are received in the GPRS network by the GGSN. If the PDP address of the MS has multiple PDP contexts established, it is essential that the GGSN be able to determine the appropriate PDP context for each packet, so that it may be transferred appropriately to the MS. This is achieved by using Traffic Flow Templates (TFTs) associated with PDP contexts. The TFTs may contain packet filtering information used by the GGSN to determine the appropriate PDP context for downlink data packets. According to current 3GPP standards, one specified item of information for use in packet filtering is the source address of the incoming data packet—eg the IP address of the source node as specified in the IP packet header. When an incoming data packet arrives at the GGSN, its source address is checked against existing TFTs associated with the PDP address of the MS. If a match is found, the packet is transferred to the MS at its PDP address according to the appropriate PDP context. If, however, no match is found, the packet may be dropped by the GGSN. Here is where the problem arises.

Let us suppose that the MS in the GPRS network is provided macro-mobility through MIPv6 and has just moved to the GPRS network which is a FN—ie it has a HA and a HAddr in a FIN (which may or may not be a GPRS network) and has moved to the GPRS network where it has been allocated a CoA. Let us now call the MS a MN and the telecommunications device in the external network a CN for consistency with MIP terminology. After moving to the GPRS network, the MN will send a binding update to its HA in its HN reporting its new CoA. It will normally also send a binding update of its new CoA to the CN. However, even if it does, the CN may still send data packets to the MN at its HAddr for various reasons. Such data packets will be intercepted by the MN's HA and tunneled to the MN using IPv6 tunneling (RFC 2473). According to RFC 2473, "At encapsulation, the source field of the tunnel IPv6 header is filled with the IPv6 address of the tunnel entry-point node"—ie the IPv6 address of the HA. Thus, a tunneled data packet arriving at the GGSN in the GPRS network will not have the IP address of the CN as its source address, but the IP address of the HA (nb this is not the HAddr of the MN). This address cannot be recognised by the GGSN using a TFT identifying the source address of the CN and the data packet may be dropped.

Conceptually, the problem may be thought of as the MIP tunnel extending past the GGSN and "hiding" the CN source address from the GGSN. This will also be the case in MIPv4 if the FA is not integrated into the GGSN but is located further towards the edges of the network, or where CoCoAs are used, since, in both cases, the tunnel end-point will again extend beyond the GGSN. Also note that this problem applies in the general case where the MN moves to the GPRS network as a FN, even if there is no communication session established with a particular CN. It may be expected that a possible future CN will want to send data packets to the MN via its HAddr for various reasons, and that this will be tunneled via the HA. Hence the problem arises in general.

The present invention provides a solution to the above problem.

SUMMARY OF CERTAIN INVENTIVE EMBODIMENTS

Embodiments of the invention relate to apparatus for and methods of enabling a gateway node of a first packet-switched data network to select a first channel for transferring a tunneled data packet to a destination packet data protocol address of a mobile node provided service in the first network, the gateway node being arranged to select the first channel from a plurality of channels each being for transferring data packets to the destination packet data protocol address of the mobile node, the selecting being performed by mapping a packet data protocol address, associated with a data packet received by the gateway node, to one or more data packet filters associated with the plurality of channels.

More particularly, but not exclusively, embodiments of the invention relate to apparatus for and methods of enabling a General Packet Radio Service Gateway Support Node (GGSN) of a 2G or 3G General Packet Radio Service (GPRS) network to select an appropriate Packet Data Protocol (PDP) Context for transferring a data packet, sent by a Correspondent Node (CN) in an external IP network, to a Mobile Node (MN) in the GPRS network, where macro-mobility of the MN is supported using the Mobile Internet Protocol, the MN is away from its Home Network (HN), and where the data packet is addressed to the Home Address of the MN and is tunneled by a Home Agent of the MN in its HN.

According to one aspect of the invention, there is provided a method of enabling a gateway node of a first packet-switched data network to select a first channel for transferring a tunneled data packet to a destination packet data protocol address of a mobile node provided service in the first network, the gateway node being arranged to select the first channel from a plurality of channels each being for transferring data packets to the destination packet data protocol address of the mobile node, the selecting being performed by matching a packet data protocol address, associated with a data packet received by the gateway node, to one or more data packet filters associated with the plurality of channels, the method comprising:

a) detecting a trigger event indicating that the gateway node may receive a data packet tunneled via a tunneling node of a second packet-switched data network external to the first network; and b) in response to the detection, arranging for a first packet data protocol address to be included in a first data packet filter associated with the first channel, the first packet data protocol address, when associated with a data packet received by the gateway node, being indicative that the data packet has been tunneled via the tunneling node, the first data packet filter being for use by the gateway node when selecting from the plurality of channels for transferring data packets to the mobile node at the destination packet data protocol address.

In one embodiment, where the gateway node is arranged to select from the plurality of channels by matching a source address of a received data packet to the one or more data packet filters associated with the plurality of channels, the first packet data protocol address is the packet data protocol address of the tunneling node. Thus, the first problem may be solved with or without modification to standardised functionality of the gateway node.

Preferably, the trigger event is detected by the mobile node, and the mobile node arranges for the inclusion of the first packet data protocol address in the first data packet filter. Preferably, the mobile node has a home packet data protocol address in the second network and the trigger event is the mobile node registering its destination packet data protocol address with the tunneling node so that data packets addressed to the mobile node at its home packet data protocol address may be tunneled by the tunneling node to the mobile node at its destination packet data protocol address.

Further aspects of the present invention include a mobile node and a gateway node arranged in accordance with the method of the first aspect described above.

According to a second aspect of the invention there is provided a method of enabling a gateway node of a first packet-switched data network to select a first channel for transferring a tunneled data packet to a destination packet data protocol address of a mobile node provided service in the first network, the gateway node being arranged to select the first channel from a plurality of channels each being for transferring data packets to the destination packet data protocol address of the mobile node, the tunneled data packet having been sent from a correspondent node and tunneled by a tunneling node of a second network external to the first network, the method comprising:

a) the tunneling node associating, with the tunneled data packet, a packet data protocol address of the correspondent node;

b) the gateway node selecting the first channel by matching the packet data protocol address associated with the tunneled data packet received by the gateway node to a first data packet filter associated with the first channel.

Further aspects of the present invention include a gateway node and a tunneling node arranged in accordance with the method of the second aspect described above.

Further aspects of the present invention are set out in the accompanying claims.

There now follows, by way of example only, a detailed description of preferred embodiments of the present invention in which:

BRIEF DESCRIPTION OF DRAWINGS

FIG. 4 is a message flow diagram, showing a PDP context modification procedure in a GPRS network enabling a GGSN to match tunneled packets for downlink to a MN to the appropriate tunnel of the PDP context, according to first and third embodiments of the present invention;

FIG. 5 is a flow diagram showing the modified procedure followed by a GGSN of a GPRS network according to the first and third embodiments of the present invention;

FIGS. 6A and 6B are block diagrams showing the modified structure of IPv6 data packets sent by the HA according to a second embodiment of the present invention;

FIG. 7 is a flow diagram showing the modified procedure followed by a GGSN of a GPRS network according to the second embodiment of the present invention;

DETAILED DESCRIPTION OF CERTAIN INVENTIVE EMBODIMENTS

Figure 1:
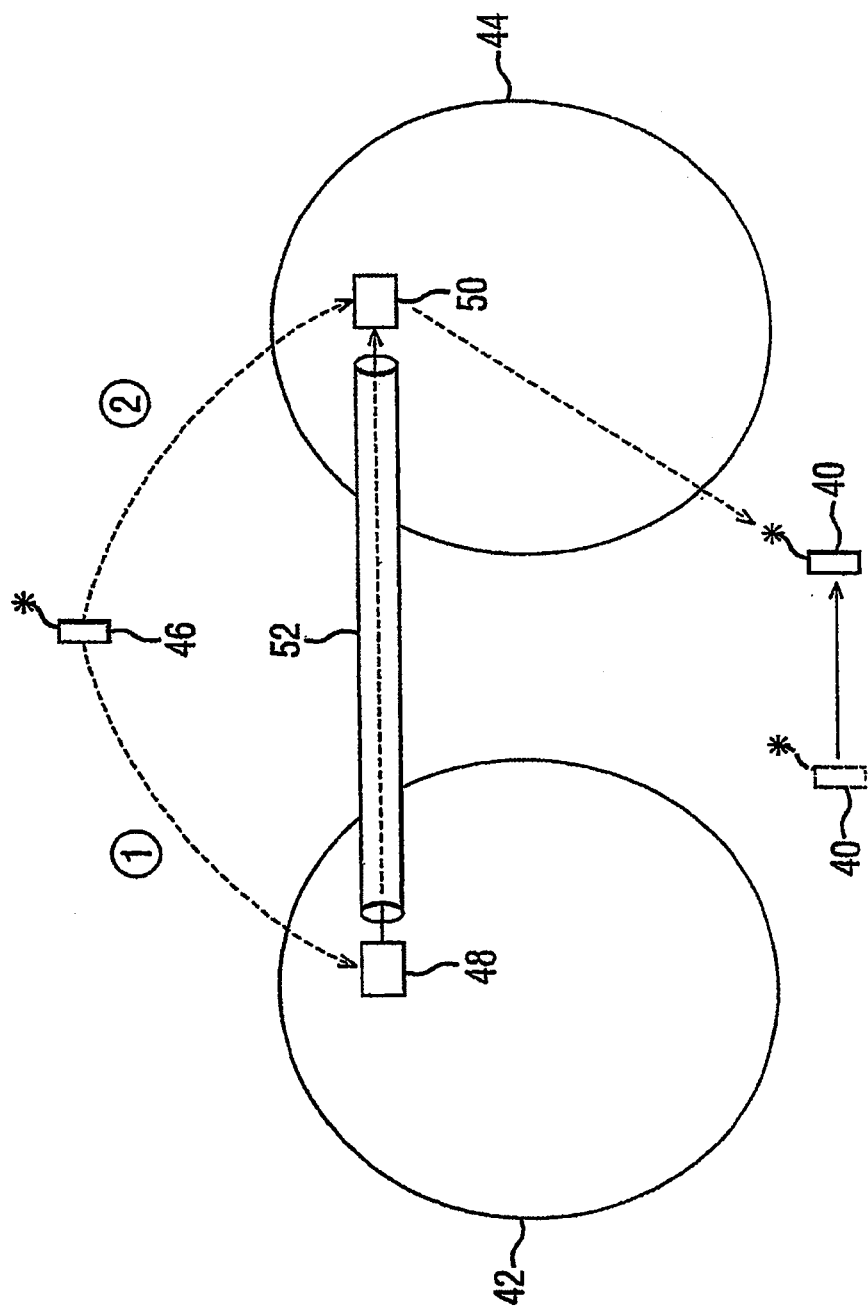
FIG. 1 is a conceptual diagram showing mobility management as provided in MIPv4.
Figure 2:
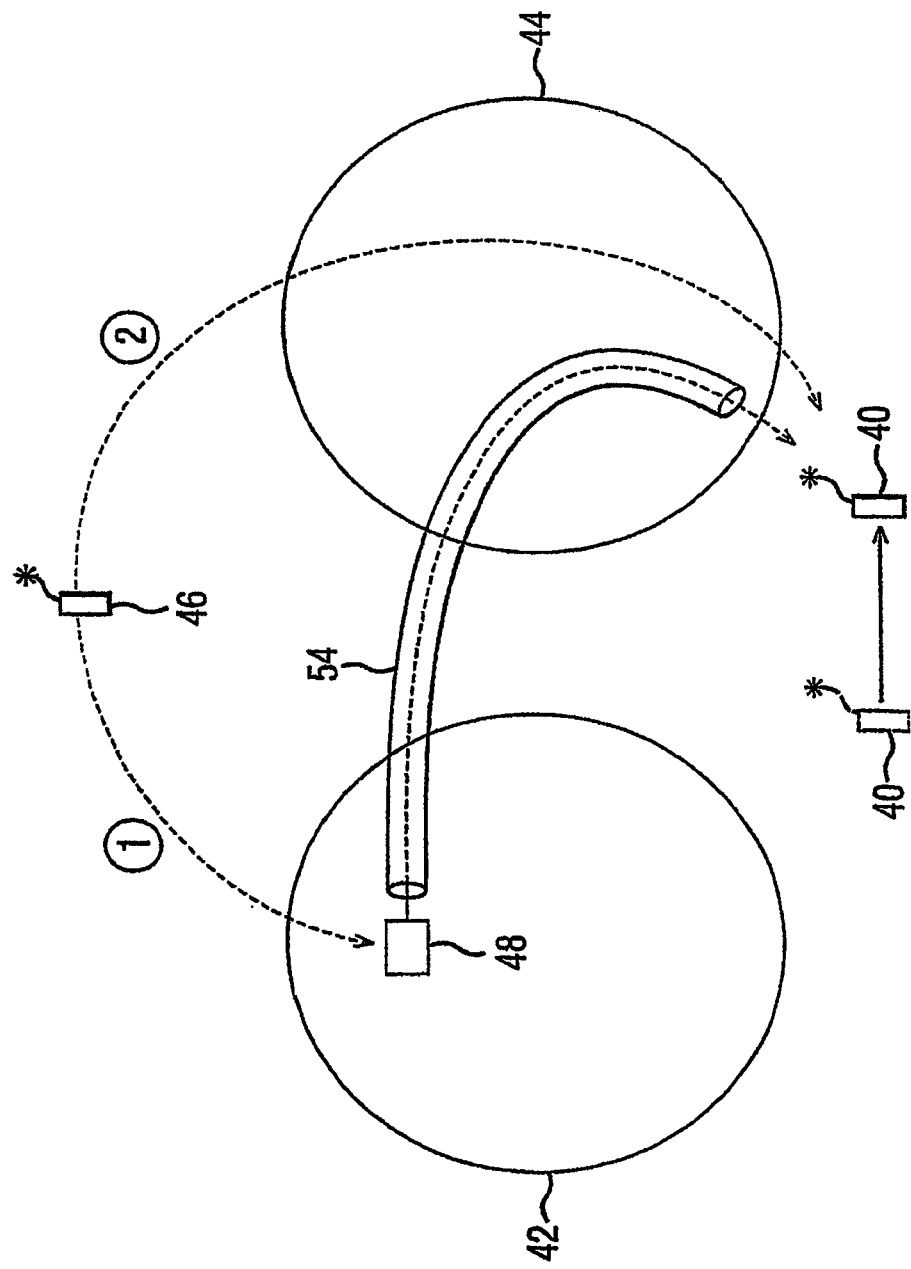
FIG. 2 is a conceptual diagram showing mobility management as provided in MIPv6.
Figure 3:
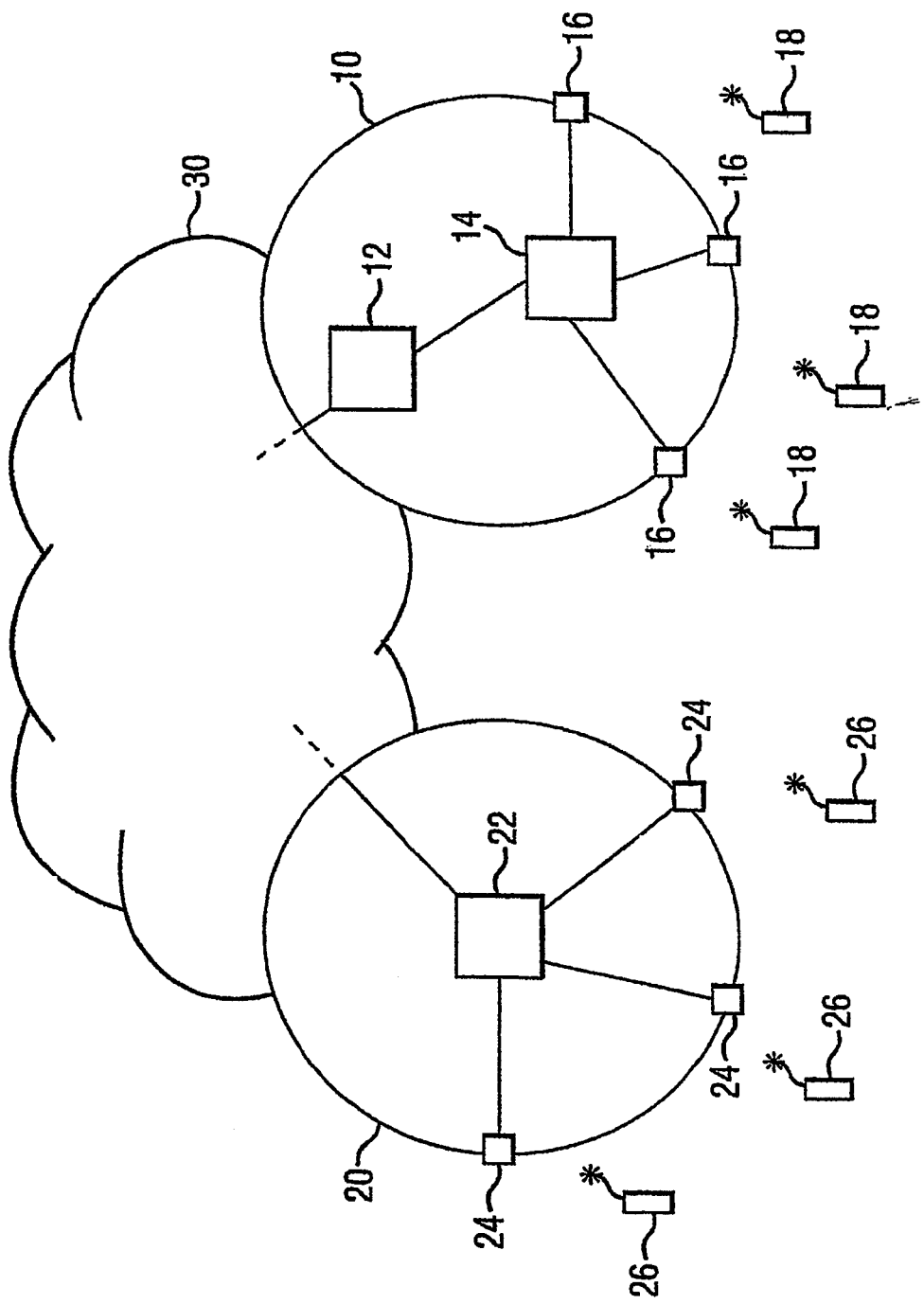
FIG. 3 is a network architectural diagram showing a GPRS network and a wLAN network connected via an external packet-switched network cloud.

FIG. 3 shows a network architecture in which both a GPRS network 10 and a wLAN network 20 are both connected with one or more external packet networks in external packet network cloud 30.

GPRS network 10 is connected to the external packet networks via one or more Gateway GPRS Support Nodes (GGSNs) (although here only one GGSN 12 is illustrated) which communicate with one or more Serving GPRS Support Nodes (SGSNs) (although here only one SGSN 14 is illustrated) via an internal IP-based packet-switched backbone network. SGSN 14 keeps track of the location of individual Mobile Stations (MSs) attached to the GPRS service and performs security functions and access control. SGSN 14 is itself connected to one or more Radio Access Networks (RANs) 16 (either the Base Station Subsystem (BSS) in the 2G GSM network or UMTS Terrestrial Radio Access Network (UTRAN) in the 3G UMTS network). The RANs' control communication over the air with one or more MSs 18.

Other major components of GPRS network 10, such as the Home Location Register (HLR) which stores GSM and UMTS subscription data and the Mobile Switching Centre/Visitor Location Register (MSC/VLR) which handles circuit-switched services and also keeps track of the location of individual Mobile Stations (MSs), are omitted for clarity. The reader is referred to the GPRS Service Description (release 1999) Technical Specification, referred to as 3G TS 23.060 v3.12.0 (2002-06) and available from the 3GPP website at http://www.3gpp.org/ftp/specs/2002-06/R1999/23_series/, which provides a detailed service description for 2G (GPRS/GSM) and 3G (GPRS/UMTS) mobile packet networks. The functionality of GPRS networks is also generally well-known, although further aspects will be described in detail below.

WLAN network 20 is connected to the external packet networks via an Access Controller (AC) 22 which controls one or more Access Points 24 which communicate over the air with one or more MSs 26. The functionality of wLAN networks is generally well-known and will not be described in detail further herein.

In order to access GPRS packet-switched services, a MS first performs a GPRS attach procedure with the SGSN (either a 2G GSM GPRS attach or a 3G UMTS GPRS attach). Authentication and location updating procedures are performed, and, if successful, the GPRS attach procedure makes the MS available for paging via the SGSN and notification of incoming packet data. However, to actually send and receive packet data, the MS must have an allocated Packet Data Protocol (PDP) address (eg an IP address) and must activate at least one PDP context for use with that PDP address. Each PDP address for a MS may have one or more PDP contexts associated with it and data defining the PDP contexts is stored in the MS, the SGSN, and the GGSN. The process of PDP context activation makes the MS known not only to the SGSN, but also to the corresponding GGSN and inter-working with external data networks can commence.

PDP contexts are used to maintain state such as routing information and Quality of Service (QoS) requirements in nodes of the GPRS network. In particular, multiple PDP contexts allow one or more levels of QoS to be specified for a single PDP address of a MS to allow efficient transfer of a variety of data traffic, such as non real-time traffic (eg intermittent and bursty data transfers, occasional transfers of large volumes of data) and real-time traffic (eg voice, video). Thus an application running on a MS with a single PDP address may utilize one or more levels of QoS according to its needs by using one or more PDP contexts. A PDP context may be in one of two states—active or inactive. When inactive, a PDP context contains no routing or mapping information to process packets related to the PDP address. No data can be transferred. When active, the PDP context for the PDP address is activated in the MS, SGSN and GGSN. The PDP context contains mapping and routing information for transferring PDP packets for that particular PDP address between the MS and the GGSN.

User data is transferred between external networks and the MS using tunneling. Between the SGSN and the MS, tunneling procedures are used which differ between 2G GSM and 3G UMTS networks. However, between the GGSN and the SGSN, packets are tunneled using a common encapsulation procedure according to the GPRS Tunnelling Protocol (GTP). The packet domain PLMN backbone network encapsulates a data packet with a GTP header, and inserts this GTP packet in a UDP packet that is again inserted in an IP packet. The IP and GTP packet headers contain the GSN addresses and tunnel endpoint identifier necessary to uniquely address a PDP context. Where there are multiple PDP contexts for a single PDP address of a MS, there must be a corresponding number of GTP tunnels established between the GGSN and the SGSN for packet data transfer. Note the GTP tunnels used in GPRS networks are not to be confused with MIP tunnels.

When multiple PDP contexts exist for a PDP address, the GGSN routes downlink packets to the different GTP tunnels based on what are called Traffic Flow Templates (TFTs) assigned to the PDP contexts. Each PDP context may be associated with a TFT. However, as a strict rule, at most one PDP context associated with the same PDP address may exist at any time with no TFT assigned to it. Thus, with n multiple PDP contexts there will always be either n TFTs or (n−1) TFTs each corresponding to individual ones of the n PDP contexts. Where there is an 1 to 1 mapping between TFTs and the GTP tunnels corresponding to each PDP context, selection of the GTP tunnel is straight forward on the basis of TFT. Where there is an (n−1) to n mapping, selection is also straight forward, but may involve a simple process of elimination if no match can be found for a TFT.

TFTs are also prioritised using evaluation precedence indices. Upon reception of a data packet, the GGSN evaluates for a match, first the packet filter amongst all TFTs that has the smallest evaluation precedence index and, in case no match is found, proceeds with the evaluation of packet filters in increasing order of their evaluation precedence index. This procedure is executed until a match is found, in which case the data packet is tunneled to the SGSN via the GTP tunnel that is associated with the PDP context corresponding to the matching TFT packet filter. According to 3G TS 23.060 Clause 9.3, if no match is found, the data packet is tunneled via the PDP context that does not have a TFT assigned to it, but if all PDP contexts have a TFT assigned, the GGSN must silently discard the data packet.

The TFTs contain attributes relating to the headers of downlink data packets which are used to filter the data packets and thus route or map them to the GTP tunnel for the correct PDP context. The attributes are defined in terms of IP header fields. According to 3G TS 23.060 Clause 15.3.2, the data packet header attributes contained in TFTs are specified in terms of both IPv4 and IPv6 header fields. Each TFT consists of between 1 and 8 packet filters, each identified by a unique packet filter identifier. A packet filter also has an evaluation precedence index that is unique within all TFTs associated with the PDP contexts that share the same PDP address. According to 3G TS 23.060 Clause 15.3.2, each valid packet filter contains a unique identifier within a given TFT, an evaluation precedence index that is unique within all TFTs for one PDP address, and at least one of the following IPv4 or IPv6 packet header attributes:

Source Address and Subnet Mask.
Protocol Number (IPv4) or Next Header (IPv6).
Destination Port Range.
Source Port Range.
IPSec Security Parameter Index (SPI).
Type of Service (TOS) (IPv4) or Traffic class (IPv6) and Mask.
Flow Label (IPv6).

However, not all of these may be used in combination without resulting in inconsistency. In practice, the Source Address and Subnet Mask will most commonly be used since, in common use cases, a MS will establish a different PDP context for its (or one of its) PDP addresses for each different correspondent node PDP address. Note that the attribute list does not contain the Destination Address attribute, only Destination Port Range. This is because TFT packet filters are not used to map packets to one of a plurality of destination addresses, but to the GTP tunnel corresponding to one of a plurality of PDP contexts established for a single destination address at a single MS.

However, as discussed above, the Source Address attribute may not be sufficient for the GGSN to map incoming packets for downlink to the MS under certain circumstances. According to the present invention, the procedure followed by a MIPv4 or MIPv6 enabled MS (we shall now call it a MN) is modified. Upon moving to the GPRS network, the MN attaches to the GPRS network and is provided a CoA (or CoCoA)—ie an IPv4 or IPv6 address—for use during its stay in the GPRS network. Using conventional MIP procedures, the MN registers this address with its HA in its HN using the MIPv4 or MIPv6 home binding update procedure. To do this it must first activate a PDP context in the GPRS network using the MS-Initiated PDP Context Activation Procedure, described in 3G TS 23.060 Clause 9.2.2 incorporated herein by reference.

First Embodiment

According to a first embodiment of the present invention, upon successful home binding, the MN then modifies the activated PDP context to include, in a TFT associated with the PDP context, the Home Agent address—ie an IPv4 or IPv6 address—to enable the GGSN to filter packets tunneled via the HA. The MN uses the MS-Initiated PDP Context Modification Procedure, described in 3G TS 23.06 Clause 9.2.3 and incorporated herein by reference. FIG. 4 shows the PDP context modification procedure. At step 60, the MN 18 performs the MIP Home binding procedure with its HA in its HN (not shown) using the activated PDP context. Assuming this is successful, at step 62, the MN send a Modify PDP Context Request to its SGSN 14. The Modify PDP Context Request message contains an instruction to add or modify a TFT associated with the PDP context to include the IP address of the MN's Home Agent in the HN. Note that the MN may optionally also send an instruction to modify the QoS profile in the Modify PDP Context Request message. At step 64, SGSN 14 sends an Update PDP Context Request message to GGSN 12 including the instruction to add or modify the TFT as above. GGSN 12 checks the instruction (for example to see if the attributes in the packet filter of the TFT form a valid combination) and if acceptable, stores or modifies the TFT for the PDP context accordingly. Then, at step 66, GGSN 12 sends an Update PDP Context Response message to SGSN 14 indicating success. At step 68, radio access bearer modification may be performed (for example in a 3G GPRS network in Iu mode where the QoS profile of the PDP context has changed). At step 70, SGSN 14 sends a Modify PDP Context Accept message to the MN to confirm the successful modification of the PDP context (i.e. the TFT).

In one alternate version of the first embodiment, a modified TFT packet filter is used in which the list of possible IPv4 or IPv6 packet header attributes that may be included in packet filter is augmented as follows:

Source Address and Subnet Mask.
Home Agent Address.
Protocol Number (IPv4) or Next Header (IPv6).
Destination Port Range.
Source Port Range.
IPSec Security Parameter Index (SPI).
Type of Service (TOS) (IPv4) or Traffic class (IPv6) and Mask.
Flow Label (IPv6).

where the Home Agent Address is the IPv4 or IPv6 address of the MIPv4 or MIPv6 HA for the MN in its HN.

Thus, for a PDP context, TFT packet filters stored at the MN, and GGSN may include the IPv4 or IPv6 address of the MN's Home Agent in a specially identified field. The behaviour of the Home Agent Address attribute, in terms of the validity of combination with other attributes, is the same as the behaviour of the Source Address attribute (see 3G TS 23.060 Clause 15.3.2). However, a TFT may comprise a packet filter having either of the Source Address and Home Agent Address attributes singly or both the Source Address and Home Agent Address attributes in combination. In the case in which both attributes are specified in a single TFT packet filter, they are treated as being alternatives—ie they are combined using the logical operator OR. Thus, a data packet either having a source address matching the Source Address attribute OR having a source address matching the Home Agent Address attribute will match at least those attributes of the TFT packet filter. The functionality of the GGSN is modified to perform matching of incoming data packets for downlink to a MS using the modified TFT packet filters. Note that the same effect is achieved by including two packet filters in a TFT—one with the Source Address attribute defined and the other with the Home Agent Address attribute defined.

The modified process followed by a GGSN according to this first version of the first embodiment is shown in the flow diagram of FIG. 5. The process starts at step 80. At step 82, the GGSN receives a data packet for downlink to a particular MN having a CoA in the GPRS network. At step 84, the GGSN checks the source address of the data packet against the Source Address fields of TFTs of PDP contexts associated with the CoA of the MN. If it is determined, at step 86, that a match exists, the process continues to step 88 where the packet is transferred to the MN using the PDP context containing the matching TFT. The process then continues to step 96 and ends. This corresponds to the conventional operation of a GGSN. However, if it is determined, at step 86, that no match exists, the process continues to step 90 where the GGSN checks the source address of the data packet against the augmented Home Agent Address fields of TFTs of PDP contexts associated with the CoA of the MN. If it is determined, at step 92, that a match exists, the process continues to step 94 where the packet is transferred to the MN using the PDP context containing the matching TFT. The process then continues to step 96 and ends. However, if it is determined, at step 92, that no match exists, the process then continues to step 96 and ends. Note that failure to match the source address of the data packet to a TFT may result in the data packet being dropped, or, alternatively, transferred to the MN using a PDP context with no associated TFT, if one exists.

Alternatively, in a second version of the first embodiment, the standard TFT packet filter attributes are used, and the MS-Initiated PDP Context Modification Procedure described above with reference to FIG. 4 is used to add a new or modify an existing TFT to add a new packet filter including the MN's HA Address in the standard Source Address attribute. This new packet filter would be in addition to any existing packet filter for the TFT. Alternatively, the packet filter may replace or modify an existing packet filter.

Whilst it has been described above that the PDP context activated after performing the MIP home binding update procedure is modified, it will be apparent that any activated PDP context may be modified to include a new or modify an existing TFT packet filter to include the MN's HA address. Thus, for example, a PDP context activated for a communication session with a CN may be modified to have an associated TFT with 1) one packet filter having both the CN's source address and MN's HA Address (using the augmented attribute list) or alternatively, 2) two packet filters—one having the CN's source address and the other the MN's HA Address (using either the augmented or standard attribute list). In this way, packets sent by the CN to the HAddr of the MN and tunneled via the HA may be filtered by the GGSN to the appropriate PDP context, as well as packets sent by the CN directly to the CoA (or CoCoA) of the MN.

It will also be apparent that a PDP context may be activated together with an associated TFT packet filter including the MN's HA address using the MS-Initiated PDP Context Activation Procedure, described in 3G TS 23.060 Clause 9.2.2 incorporated herein by reference. Thus, for example, a PDP context may be activated for a communication session with a CN and, in the activation procedure, a TFT may be associated with the PDP context having either: 1) one packet filter having both the CN's source address and MN's HA Address (using the augmented attribute list) or, alternatively, 2) two packet filters—one having the CN's source address and the other the MN's HA Address (using either the augmented or standard attribute list). In this way, packets sent by the CN to the HAddr of the MN and tunneled via the HA may be filtered by the GGSN to the appropriate PDP context, as well as packets sent by the CN directly to the CoA (or CoCoA) of the MN.

It will be apparent that in the first embodiment, events other than the MN performing a home binding procedure may be used to trigger the creation or modification of TFT packet filters as described. In general, any node of the GPRS network may detect that a packet for the MN may be tunneled and may thus instruct the MN or otherwise arrange for creation or modification of TFT packet filters as described.

Second Embodiment

According to a second embodiment of the present invention, which applies to MN's having an IPv6 HAddr, the HA of the MN is modified to include the IP address of the CN in an IPv6 Hop-by-Hop Options extension header of the encapsulating IPv6 packet for all data packets it tunnels to the MN. FIG. 6A shows the structure of the encapsulating data packet. The basic IPv6 header 100 comes first. The existence of the IPv6 Hop-by-Hop Options extension header 102 is indicated, according to standard IPv6 (RFC 2460), by placing a zero in the IPv6 Next Header field of the basic IPv6 header 100. The Hop-by-Hop Options extension header 102 then immediately follows the basic IPv6 header 100. Finally, the payload 104—ie the upper layer header such as TCP or UDP and the encapsulated data packet—follows the Hop-by-Hop Options extension header 102. FIG. 6B shows the structure of the Hop-by-Hop Options extension header 102. The Next Header and Hdr Ext Len fields of the Hop-by-Hop Options extension header 102 are omitted for clarity. The IP address of the CN is included in a Type-Length-Value (TLV) encoded option in the Hop-by-Hop Options extension header 102. Thus, a suitable Options Type number (8-bits) 106 is used to identify the type of option (ie the specification of the HAddr of the MN for a packet tunneled via the MN's HA) followed by the Option Data Length 108 (which depends on the length of the CN address) followed by the Option Data itself—ie the CN address 110.

In this embodiment, the GGSN is IPv6 enabled and examines the Hop-by-Hop extension header of any received IPv6 packet having such a header. Note that, since the tunnel from the HA extends all the way to the MN, the GGSN is an intermediate node and, according to the IPv6 specification (RFC 2460), the GGSN must examine the Hop-by-Hop extension header. Conversely, note that, according to the IPv6 specification (RFC 2460), the GGSN must not examine any other IPv6 extension header since it is an intermediate node. Furthermore, the GGSN is modified to attempt to map the IP address of the CN identified in an IPv6 data packet containing a Hop-by-Hop extension header to the TFT packet filters stored for PDP contexts associated with the CoA of the MN, and, if a match is found, to transfer the data packets accordingly. The process followed by the GGSN is shown in FIG. 7. The process starts at step 120. At step 122, the GGSN receives a data packet for downlink to a particular MN having a CoA in the GPRS network At step 124, the GGSN examines the a Hop-by-Hop Options extension header of the received packet. At step 126, the GGSN checks the CN address specified in the Hop-by-Hop Options extension header against the Source Address fields of TFTs of PDP contexts associated with the IP address of the MN (ie its CoA). If it is determined, at step 128, that a match exists, the process continues to step 130 where the packet is transferred to the MN using the PDP context containing the matching TFT. The process then continues to step 132 and ends. However, if it is determined, at step 128, that no match exists, the process then continues to step 132 and ends.

The GGSN will also attempt to match the source address of the received data packet to the Source Address fields of TFTs of PDP contexts associated with the MN according to standard GGSN functionality. Thus, a data packet either having a source address matching the Source Address attribute OR having an IP address specified in a Hop-by-Hop Options Header matching the Source Address attribute—being the IP address of the CN—will match at least those attributes of the TFT packet filter and will be routed to the GTP tunnel corresponding to the appropriate PDP context. Note that failure to match the data packet to a TFT may result in the data packet being dropped, or, alternatively, transferred to the MN using a PDP context with no associated TFT, if one exists. Optionally, after receiving the tunneled data packet, the MN may then modify or create a new PDP context to enable tunneled data packets to be transferred by the GGSN to the MN as described above in relation to the first embodiment.

In a variant of the second embodiment, the HA of the MN is modified to selectively include the IP address of the CN in an IPv6 Hop-by-Hop Options extension header of the encapsulating IPv6 packet for data packets it tunnels to the MN. The inclusion is only performed when the HA detects that the MN is being provided service in a GPRS network. Thus, the processing overheads of a) the HA including a Hop-by-Hop Options extension header in the tunneled data packet, and b) the intermediate nodes on the route towards the MN (including the GGSN) examining the Hop-by-Hop Options extension header are eliminated where they are not necessary.

Third Embodiment

According to a third embodiment of the present invention, a PDP context with no associated TFT is always established when a MIP enabled MN is away from home in a GPRS network. Thus, on receipt of a data packet, the GGSN will attempt to match the packet to those PDP contexts with associated TFTs, but if this fails, the packet will be routed using the PDP context with no associated TFT. Thus a packet tunneled via the HA of the MN will be transferred by the GGSN to the MN where it may be de-capsulated. The MN may then associate the packet with an existing communication session, if there is one, by examining the source address of the de-capsulated packet. The MN may then modify or create a new PDP context to enable tunneled data packets to be transferred by the GGSN to the MN as described above in relation to the first embodiment.

The approaches of first and second embodiments are preferable to the approach of the third embodiment since no QoS can be supported in this approach because the PDP context has no associated TFT. Also, the approach wastes bearer resources since a GTP tunnel and PDP context must be maintained for traffic possibly routed via the HA of the MN, despite there being a PDP context and corresponding GTP tunnel already established for the communication session with the CN. However, the approach may be useful for some services without specific QoS requirements such as Background Class services and non-realtime services.

Fourth Embodiment

According to a fourth embodiment of the present invention, the HA tunneling procedure is modified as follows. Firstly, the HA does not address tunneled data packets to the CoA of the MN but to the address of the GGSN in the GPRS network. It will shortly be described below how the HA may be provided with the address of the GGSN if it doesn't already know it. Secondly, the HA includes the CN address in an IPv6 Destination Option Header which may be read by the GGSN on arrival of the tunneled data packet. Thirdly, the CoA of the MN is included in an IPv6 Routing Header Type 0 extension header of the tunneled packet. This Routing Header enables an IPv6 packet to be routed through a plurality of nodes at various addresses starting off by being delivered to the destination address of the packet (in this case the GGSN) and then being forwarded in turn to each node corresponding to a list of further routing addresses contained in the Routing Header (in this case just to the CoA of the MN).

Figure 8A:
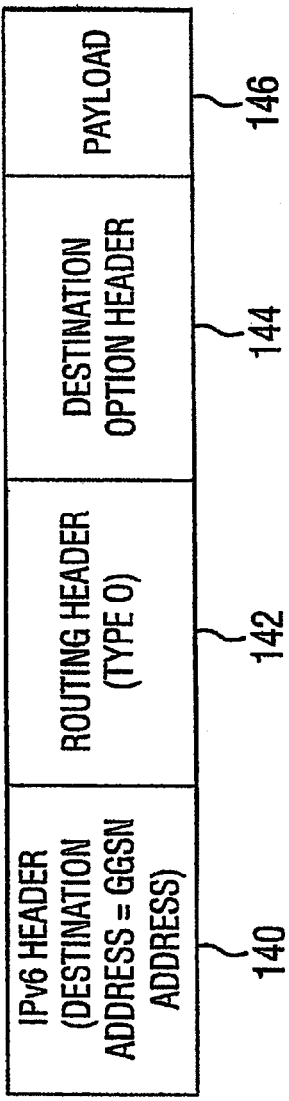
FIGS. 8A, 8B and 8C are block diagrams showing the modified structure of IPv6 data packets sent by the HA according to a fourth embodiment of the present invention.

FIG. 8A shows the structure of the encapsulating data packet. The basic IPv6 header 140 comes first. The existence of the IPv6 Routing Header (Type 0) 142 is indicated, according to standard IPv6 (RFC 2460), in the IPv6 Next Header field of the basic IPv6 header 100. Note that the destination address in the basic IPv6 header 140 is the address of the GGSN. The IPv6 Routing Header (Type 0) 142 then immediately follows the basic IPv6 header 140. The existence of the IPv6 Destination Option extension header 144 is indicated, according to standard IPv6 (RFC 2460), in the IPv6 Next Header field of the IPv6 Routing Header (Type 0) 142. The IPv6 Destination Option extension header 144 then immediately follows the IPv6 Routing Header (Type 0) 142. Finally, the payload 146—ie the upper layer header such as TCP or UDP and the encapsulated data packet—follows the Destination Option extension header 144.

Figure 8B:
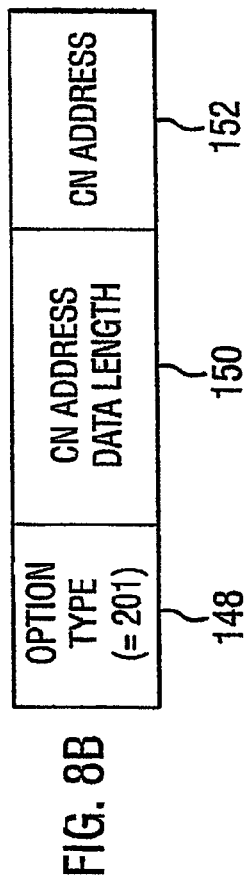

FIG. 8B shows the structure of the Destination Option extension header 144 itself. The format of this extension header is described in the MIPv6 Internet Draft at Clause 6.3. The Next Header and Hdr Ext Len fields of the Destination Option extension header 144 are omitted for clarity. The address of the CN is included in a Type-Length-Value (TLV) encoded option in the Destination Option extension header 144. Thus, the Options Type number 148 is used to identify the type of option (in this case 201 as specified in MIPv6) followed by the Option Data Length 150 (which depends on the length of the address of the CN) followed by the Option Data itself—ie the CN address 152.

Figure 8C:
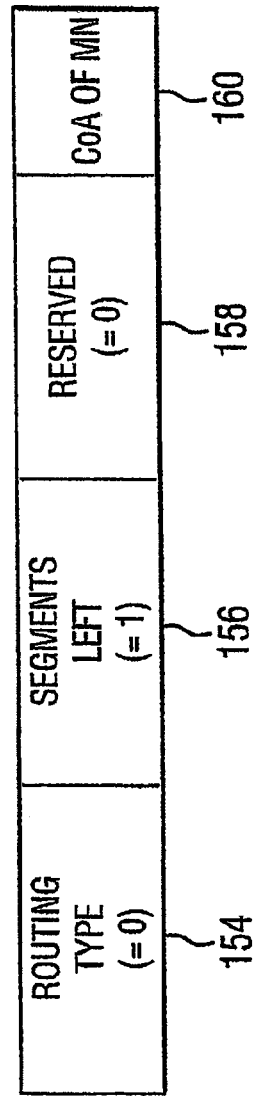

FIG. 8C shows the structure of the Routing Header (Type 0) extension header 142 itself. The format of this extension header is described in the IPv6 (RFC 2460). The Next Header and Hdr Ext Len fields of the Routing Header (Type 0) extension header 142 are omitted for clarity. The Routing Type field 154 (ie 0 in this case) comes next, followed by the Segments Left field, which is initially set to 1 by the HA (this counts down to 0 as the data packet is forwarded to from the GGSN to the CoA of the MN). Then follows a reserved field (set to 0) and then the CoA of the MN itself.

In this embodiment, the GGSN is IPv6-enabled and examines the Destinations Option extension header 144 of the received IPv6 packet before forwarding it according to the Routing Header (Type 0) extension header 142. Note, that by providing the address of the GGSN as the destination address, the tunneled packet will first be delivered to the GGSN which will be a destination node (rather than an intermediate node as in the third embodiment) and therefore able to read the Destinations Option extension header 144. Furthermore, the GGSN is modified to attempt to map the IP address of the CN, identified in the Destinations Option header, to the TFT packet filters stored for PDP contexts associated with the CoA of the MN, which is included in the IPv6 Routing Header Type 0 Option. If a match is found, the GGSN transfer the data packets to the GTP tunnel associated with the appropriate PDP context of the CoA of the MN accordingly.

Figure 9:
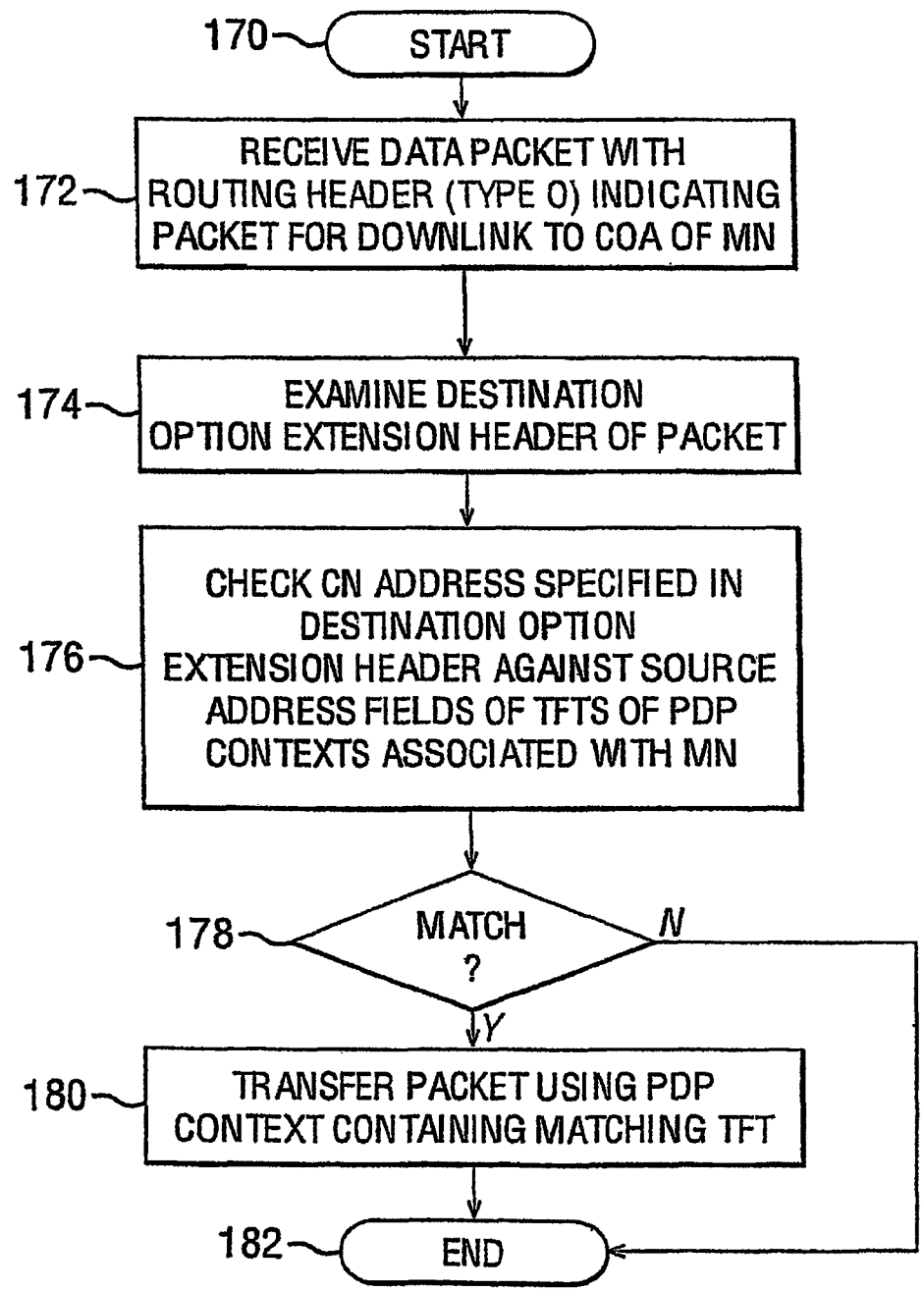
FIG. 9 is a flow diagram showing the modified procedure followed by a GGSN of a GPRS network according to the fourth embodiment of the present invention.

The process followed by the GGSN is shown in FIG. 9. The process starts at step 170. At step 172, the GGSN receives a data packet with an IPv6 Routing Header Type 0 indicating that the packet is for downlink to the CoA of a particular MN having a CoA in the GPRS network. At step 174, the GGSN examines the Destinations Option extension header of the received packet. At step 176, the GGSN checks the CN address specified in the Destinations Option extension header against the Source Address fields of TFTs of PDP contexts associated with the CoA of the MN. If it is determined, at step 178, that a match exists, the process continues to step 180 where the packet is transferred to the MN using the PDP context containing the matching TFT. The process then continues to step 182 and ends. However, if it is determined, at step 178, that no match exists, the process then continues to step 182 and ends.

The GGSN will also attempt to match the source address of the received data packet to the Source Address fields of TFTs of PDP contexts associated with the MN according to standard GGSN functionality. Thus, a data packet either having a source address matching the Source Address attribute OR having an IP address specified in a Destinations Option Header matching the Source IP Address attribute—being the IP address of the CN—will match at least those attributes of the TFT packet filter and will be routed to the GTP tunnel corresponding to the appropriate PDP context. Optionally, the MN may then modify or create a new PDP context to enable tunneled data packets to be transferred by the GGSN to the MN as described above in relation to the first embodiment.

However, as indicated above, this procedure requires the HA to know or be provided with the address of the GGSN in the GPRS network. The HA may know of the address of the GGSN in the GPRS network by reason of a commercial arrangement between the two networks, such as a roaming agreement for example. However, if it does not, it may be provided with the address as follows. Preferably at the same time as performing a home binding update procedure, but possibly later, the MN may send a message or, preferably, instruct the GGSN itself to send a message to the HA containing the IP address of the GGSN. The MN may instruct its GGSN to send such a packet using PDP Configuration Options which are described in 3G TS 23.060 Clause 9.2.2, incorporated herein by reference. PDP Configuration Options contain optional PDP parameters that the GGSN may transfer to a MS. The sending of these optional PDP parameters may be requested by the MN in the Activate PDP Context Request message used to establish a PDP context for use when sending the home binding update to the HA upon the MN first moving to the GPRS network In a variant of the fourth embodiment, the HA functionality is modified to selectively use the procedure described above only when the HA is informed by the MN that it (the MN) is being provided service in a GPRS network.

It will be apparent that the present invention applies to networks other than GPRS network. In general, it applies to any network in which a gateway node may need to select one from a plurality of channels (whether PDP contexts or otherwise) for transferring downlink packets towards a node, whether a user or network-side node.

It will also be apparent that the present invention applies to situations where the node (whether a user node or a network node) may receive tunneled packets for reasons other than it being a MIP-enabled MN. In general, the present invention applies whenever packets may be tunneled between networks or subnetworks, where the gateway node may need to select one from a plurality of channels for transferring downlink packets towards a node, and where the tunnel extends beyond the gateway node or nodes of the destination network. For instance, the present invention has application in Virtual Private Networks using the Layer 2 Tunneling Protocol (L2TP) or other tunneling protocols.

The present invention also applies to the situations where gateway nodes need to perform general packet filtering and/or firewall functions for protection against unauthorised service/bearer access and/or service attacks.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. The scope of the invention is indicated by the appended claims rather than by the foregoing description. All changes which come within the meaning and range of equivalency of the claims are to be embraced within their scope.

What is claimed is:

1. A method of a gateway node of a first packet-switched data network selecting a first channel for transferring a tunneled data packet to a destination packet data protocol address of a mobile node provided service in the first network, wherein the gateway node is configured to select the first channel from a plurality of channels configured to transfer data packets to the destination packet data protocol address of the mobile node, wherein the tunneled data packet is sent from a correspondent node and tunneled by a tunneling node of a second network external to the first network, the method comprising:

sending a data packet comprising data from the correspondent node to the mobile node;

after sending the data packet, including the packet data protocol address of the correspondent node in a first data packet filter of the first channel;

the tunneling node including the packet data protocol address of the correspondent node in the tunneled data packet; and the gateway node selecting the first channel by matching the packet data protocol address of the correspondent node to the first data packet filter associated with the first channel.

2. The method according to claim 1, wherein the tunneled data packet is an Internet Protocol version 6 (IPv6) data packet and the packet data protocol address of the correspondent node is included in a Hop-by-Hop extension header of the tunneled data packet.

3. The method according to claim 1, wherein the packet data protocol address of the correspondent node is included in a Destination Option extension header of the tunneled data packet.

4. The method according to claim 3, wherein the tunneling node addresses the tunneled data packet to the packet data protocol address of the gateway node, and wherein the destination packet data protocol address of the mobile node is associated with the tunneled data packet.

5. The method according to claim 4, wherein the tunneled data packet is an Internet Protocol version 6 (IPv6) data packet and the destination packet data protocol address of the mobile node is associated with the tunneled data packet sent to the gateway node by being included in a Routing Header Type 0 Option header of the tunneled data packet.

6. The method according to claim 1, wherein mobility of the mobile node between networks or subnetworks is supported using the Mobile Internet Protocol (MIP) standards, and wherein the tunneling node is a home agent (HA) of the mobile node.

7. The method according to claim 1, wherein the first network conforms to the General Packet Radio Service (GPRS) standards and the plurality of channels correspond to a plurality of packet data protocol contexts in the first network.

8. A gateway node of a first packet-switched data network, wherein the gateway node is configured to select a first channel for transferring a tunneled data packet to a destination packet data protocol address of a mobile node provided service in the first network, wherein after a data packet comprising data from the correspondent node is sent to the mobile node, the packet data protocol address of the correspondent node is included in a first data packet filter of the first channel, wherein the first channel is selected from a plurality of channels configured to transfer data packets to the destination packet data protocol address of the mobile node, wherein the tunneled data packet is sent from a correspondent node and tunneled by a tunneling node of a second network external to the first network, wherein the gateway node is configured to select the first channel by matching a packet data protocol address of the correspondent node to the first data packet filter associated with the first channel, and wherein the packet data protocol address is included in the tunneled data packet received by the gateway node.

9. The gateway node according to claim 8, wherein the tunneled data packet is an Internet Protocol version 6 (IPv6) data packet and the packet data protocol address of the correspondent node is included in a Hop-by-Hop extension header of the tunneled data packet.

10. The gateway node according to claim 8, wherein the packet data protocol address of the correspondent node is included in a Destination Option extension header of the tunneled data packet.

11. The gateway node according to claim 10, wherein the tunneled data packet is addressed to the packet data protocol address of the gateway node, and wherein the destination packet data protocol address of the mobile node is associated with the tunneled data packet.

12. The gateway node according to claim 11, wherein the tunneled data packet is an Internet Protocol version 6 (IPv6) data packet and the destination packet data protocol address of the mobile node is associated with the tunneled data packet sent to the gateway node by being included in a Routing Header Type 0 Option header of the tunneled data packet.

13. The gateway node according to claim 8, wherein mobility of the mobile node between networks or subnetworks is supported using the Mobile Internet Protocol (MIP) standards, and wherein the tunneling node is a home agent (HA) of the mobile node.

14. The gateway node according to claim 8, wherein the first network conforms to the General Packet Radio Service (GPRS) standards and the plurality of channels correspond to a plurality of packet data protocol contexts in the first network.

15. A tunneling node of a second packet-switched data network external to a first packet-switched data network, wherein the tunneling node is configured to tunnel a data packet sent from a correspondent node to a mobile node provided service in the first data network, wherein the first data network comprises a gateway node configured to select a first channel for transferring the tunneled data packet to a destination packet data protocol address of a mobile node, wherein after a data packet comprising data from the correspondent node is sent to the mobile node, the packet data protocol address of the correspondent node is included in a first data packet filter of the first channel, wherein the gateway node is configured to select the first channel from a plurality of channels configured to transfer data packets to the destination packet data protocol address of the mobile node, wherein the tunneling node is arranged to include a packet data protocol address of the correspondent node in the tunneled data packet, and wherein the gateway node selects the first channel by matching the packet data protocol address of the correspondent node to the first data packet filter associated with the first channel.

16. The tunneling node according to claim 15, wherein the tunneled data packet is an Internet Protocol version 6 (IPv6) data packet and the packet data protocol address of the correspondent node is included in a Hop-by-Hop extension header of the tunneled data packet.

17. The tunneling node according to claim 16, wherein the packet data protocol address of the correspondent node is included in a Destination Option extension header of the tunneled data packet.

18. The tunneling node according to claim 17, wherein the tunneling node associates the destination packet data protocol address of the mobile with the tunneled data packet and addresses the tunneled data packet to the packet data protocol address of the gateway node.

19. The tunneling node according to claim 18, wherein the tunneled data packet is an Internet Protocol version 6 (IPv6) data packet and the destination packet data protocol address of the mobile node is associated with the tunneled data packet sent to the gateway node by being included in a Routing Header Type 0 Option header of the tunneled data packet.

20. The tunneling node according to claim 15, wherein mobility of the mobile node between networks or subnetworks is supported using the Mobile Internet Protocol (MIP) standards, and the tunneling node is a home agent (HA) of the mobile node.

21. The tunneling node according to claim 15, wherein the first network conforms to the General Packet Radio Service (GPRS) standards and the plurality of channels correspond to a plurality of packet data protocol contexts in the first network.

* * * * *